(12) United States Patent
Parks

(10) Patent No.: US 7,559,191 B2
(45) Date of Patent: Jul. 14, 2009

(54) DUCTED SPINNER FOR ENGINE COOLING

(75) Inventor: Robert Parks, San Jose, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 469 days.

(21) Appl. No.: 11/228,352

(22) Filed: Sep. 19, 2005

(65) Prior Publication Data

US 2006/0102780 A1   May 18, 2006

Related U.S. Application Data

(60) Provisional application No. 60/610,570, filed on Sep. 17, 2004.

(51) Int. Cl.
*F02K 3/04* (2006.01)
(52) U.S. Cl. ............... 60/204; 60/226.1; 416/94; 416/245 R
(58) Field of Classification Search ............... 60/204, 60/226.1, 266, 269; 416/93 R, 94, 245 R
See application file for complete search history.

(56) References Cited

U.S. PATENT DOCUMENTS

| | | |
|---|---|---|
| 1,918,426 A | 7/1933 | Radnor |
| 2,058,678 A | 10/1936 | Fry |
| 2,328,786 A | 9/1943 | Crowder |
| 2,330,622 A | 9/1943 | Ramshorn |
| 2,338,751 A | 1/1944 | Zuck |
| 2,347,230 A | 4/1944 | Zuck |
| 2,397,632 A | 4/1946 | Stuart |
| 2,410,967 A | 11/1946 | Eaton |
| 2,417,725 A | 3/1947 | Zuck |
| 2,444,781 A | 7/1948 | Leonard |
| D153,331 S | 4/1949 | Zuck |
| D154,829 S | 4/1949 | Zuck |
| 2,477,637 A | 8/1949 | Mercier |
| 2,479,125 A | 8/1949 | Leonard |
| 2,575,415 A | 11/1951 | Grimac |
| 2,593,541 A | 4/1952 | Cowdrey et al |

(Continued)

OTHER PUBLICATIONS http://en.wikipedia.org/wiki/Moment_of_inertia; available on the web Feb. 19, 2008; 8 pages.

(Continued)

*Primary Examiner*—Louis J Casaregola
(74) *Attorney, Agent, or Firm*—Katten Muchin Rosenman LLP

(57) ABSTRACT

A system for cooling a ducted fan aircraft engine includes a first nacelle surrounding the engine and a second nacelle substantially concentrically surrounding the first nacelle. The system includes a first spinner coupled around a base of a rotor of the ducted fan and a second spinner substantially concentrically surrounding the first spinner and forming a duct between first and second spinners. The second spinner includes an opening to allow air to flow into the duct. The rotor includes a plurality of airfoils penetrating through the first and second spinners. Each of the airfoils includes a first portion located in the duct, and a second portion located between the second spinner and a fuselage of the ducted fan. The first portions of the airfoils provide cooling airflow over the engine and structural support for the second portions. The second portions of the airfoils provide thrust for the aircraft.

28 Claims, 8 Drawing Sheets

U.S. PATENT DOCUMENTS

| | | | |
|---|---|---|---|
| 2,622,826 A | 12/1952 | Prince | |
| 2,670,050 A | 2/1954 | Enos | |
| 2,712,420 A | 7/1955 | Amster et al. | |
| 2,726,725 A * | 12/1955 | Nichols | 416/94 |
| 2,848,180 A | 8/1958 | Ploger | |
| 2,866,608 A | 12/1958 | Leonard | |
| 2,908,472 A | 10/1959 | McDonald | |
| 2,959,373 A | 11/1960 | Zuck | |
| 2,994,493 A | 8/1961 | Hartman | |
| 3,056,564 A | 10/1962 | Zuck | |
| 3,096,952 A | 7/1963 | Roppel | |
| 3,100,377 A | 8/1963 | Kosin et al. | |
| 3,138,351 A | 6/1964 | Zuck | |
| 3,142,455 A | 7/1964 | Wilford | |
| 3,164,222 A | 1/1965 | Conrad | |
| 3,166,271 A | 1/1965 | Zuck | |
| 3,169,728 A | 2/1965 | Messerschmitt et al. | |
| 3,175,789 A | 3/1965 | Blumrich | |
| 3,179,353 A | 4/1965 | Peterson | |
| 3,258,206 A | 6/1966 | Simonson | |
| 3,350,035 A | 10/1967 | Schlieben | |
| 3,387,805 A | 6/1968 | Barnett et al. | |
| 3,415,469 A | 12/1968 | Spratt | |
| 3,475,913 A | 11/1969 | Mortlock et al. | |
| 3,511,455 A | 5/1970 | Weick | |
| 3,563,496 A | 2/1971 | Zuck | |
| 3,664,463 A | 5/1972 | Kuethe | |
| 3,730,459 A | 5/1973 | Zuck | |
| 3,806,068 A | 4/1974 | Blythe et al. | |
| 3,987,981 A | 10/1976 | Kook | |
| 4,005,835 A | 2/1977 | Gerstine et al. | |
| 4,037,405 A | 7/1977 | Huenniger et al. | |
| 4,045,948 A | 9/1977 | Hannibal | |
| 4,071,207 A | 1/1978 | Piasecki et al. | |
| 4,092,716 A | 5/1978 | Berg et al. | |
| 4,124,180 A | 11/1978 | Wolowicz | |
| 4,155,221 A | 5/1979 | Dhoore et al. | |
| 4,175,385 A | 11/1979 | Nash | |
| 4,214,703 A | 7/1980 | Sorensen et al. | |
| 4,241,876 A | 12/1980 | Pedersen | |
| 4,250,658 A | 2/1981 | Kress | |
| 4,358,074 A | 11/1982 | Schoen et al. | |
| 4,415,132 A | 11/1983 | Shirk | |
| 4,474,534 A | 10/1984 | Thode | |
| 4,519,559 A | 5/1985 | Logan et al. | |
| 4,568,043 A | 2/1986 | Schmittle | |
| 4,575,006 A | 3/1986 | Madden | |
| 4,596,368 A | 6/1986 | Schmittle | |
| 4,630,788 A | 12/1986 | Veaux et al. | |
| 4,634,081 A | 1/1987 | Chee | |
| 4,709,879 A | 12/1987 | Stafford | |
| 4,804,155 A | 2/1989 | Strumbos | |
| 4,821,980 A | 4/1989 | Clausen et al. | |
| 4,875,655 A | 10/1989 | Bender et al. | |
| 4,928,907 A | 5/1990 | Zuck | |
| 4,948,072 A | 8/1990 | Garland et al. | |
| 4,964,599 A | 10/1990 | Farineau | |
| 4,967,984 A | 11/1990 | Allen | |
| 4,978,071 A | 12/1990 | MacLean et al. | |
| 5,000,404 A | 3/1991 | Martorella | |
| 5,028,001 A | 7/1991 | Bender et al. | |
| 5,056,738 A | 10/1991 | Mercer et al. | |
| 5,062,587 A | 11/1991 | Wernicke | |
| 5,067,668 A | 11/1991 | Zuck | |
| 5,086,993 A | 2/1992 | Wainfan | |
| 5,115,996 A | 5/1992 | Moller | |
| 5,116,030 A | 5/1992 | Nowak et al. | |
| 5,176,339 A | 1/1993 | Schmidt | |
| 5,280,863 A | 1/1994 | Schmittle | |
| 5,282,358 A | 2/1994 | Schilling | |
| 5,289,994 A | 3/1994 | Del Campo Aguilera | |
| 5,294,077 A | 3/1994 | Derrien | |
| 5,295,643 A | 3/1994 | Ebbert et al. | |
| 5,340,057 A | 8/1994 | Schmittle | |
| 5,366,180 A | 11/1994 | Wainfan et al. | |
| 5,366,181 A | 11/1994 | Hanson | |
| 5,390,877 A | 2/1995 | Nightingale | |
| 5,395,073 A | 3/1995 | Rutan et al. | |
| 5,509,623 A | 4/1996 | Schmittle | |
| 5,516,060 A | 5/1996 | McDonnell | |
| 5,524,847 A | 6/1996 | Brodell et al. | |
| 5,560,568 A | 10/1996 | Schmittle | |
| 5,666,803 A | 9/1997 | Windisch | |
| 5,687,948 A | 11/1997 | Whiteford et al. | |
| 5,746,390 A | 5/1998 | Chiapetta | |
| 5,765,777 A | 6/1998 | Schmittle | |
| 5,765,783 A | 6/1998 | Albion | |
| 5,769,359 A | 6/1998 | Rutan et al. | |
| 5,842,687 A | 12/1998 | David | |
| 5,941,478 A | 8/1999 | Schmittle | |
| RE36,487 E | 1/2000 | Wainfan | |
| 6,168,117 B1 | 1/2001 | Shinagawa | |
| 6,170,778 B1 | 1/2001 | Cycon et al. | |
| 6,293,141 B1 | 9/2001 | Nance | |
| 6,318,668 B1 | 11/2001 | Ulanoski et al. | |
| 6,328,259 B1 | 12/2001 | Bolukbasi | |
| 6,336,610 B1 | 1/2002 | Wode | |
| 6,343,768 B1 | 2/2002 | Muldoon | |
| 6,358,014 B1 | 3/2002 | Chou et al. | |
| 6,364,603 B1 | 4/2002 | Czahor et al. | |
| 6,382,556 B1 | 5/2002 | Pham | |
| 6,382,559 B1 | 5/2002 | Sutterfield et al. | |
| 6,471,198 B2 | 10/2002 | Herbst | |
| 6,474,603 B1 | 11/2002 | Kinkead et al. | |
| 6,539,290 B1 | 3/2003 | Vos | |
| 6,543,718 B2 | 4/2003 | Provost | |
| 6,547,180 B1 | 4/2003 | Cassidy | |
| 6,561,455 B2 | 5/2003 | Capanna | |
| 6,568,635 B2 | 5/2003 | Carpenter | |
| 6,592,071 B2 | 7/2003 | Kinkead et al. | |
| 6,751,946 B2 | 6/2004 | Li | |
| 6,783,096 B2 | 8/2004 | Baldwin | |
| 6,808,140 B2 | 10/2004 | Moller | |
| 2003/0127569 A1 | 7/2003 | Bacon et al. | |
| 2003/0141418 A1 | 7/2003 | Darbyshire | |
| 2004/0026563 A1 | 2/2004 | Moller | |

OTHER PUBLICATIONS

Notification of Transmittal of the International Search Report and the Written Opinion of the International Searching Authority or Declaration for International Application No. PCT/US05/33232; mailed Apr. 17, 2008; 8 pages.

International Search Report & Written Opinion dated Nov. 19, 2007, issued in PCT/US05/33235 (10 pages).

NASA, Pitot-Static Tube, http://www.grc.nasa.gov/WWW/K-12/airplane/pitot.html.

Chuck Wilkins; "Team GoldenEye Selected for Phase II of DARPA OAV-II Program"; Aurora Flight Sciences Corp. Press release, APR-165; Jul. 13, 2004; 1 Page.

Chuck Wilkins; "Team GoldenEye to Develop Organic Air Vehicle for DARPA"; Aurora Flight Sciences Press Release, APR-158; Dec. 7, 2004; 2 Pages.

http://en.wikipedia.org/wiki/Attitude_indicator; available on the web Jul. 30, 2004; 1 page.

http://www.tpub.com/content aviation/14030/css/14030_205.htm; available on the web Sep. 26, 2003; 1 page.

http://www.grc.nasa.gov/WWW/K-12/airplane/pitot.html; available on the web May 22, 2000; 3 pages.

Notification of Transmittal of the International Search Report and the Written Opinion, the International Search Report, and the Written Opinion for International Application No. PCT/US05/33233; mailed Dec. 14, 2006; 12 pages.

"Freewing Scorpion UAV", http://www.scaled.com/projects/freewing.html; Nov. 16, 2006; 2 pages.

http://en.wikipedia.org/wiki/Inertial_measurement_unit; available on the web Nov. 27, 2002; 2 pages.

GoldenEye-50 Transition Images. Aurora Flight Sciences. http://www.aurora.aero/GE50/images/GE-transition.jpg; Nov. 28, 2006; 2 pages.

"GoldenEye's First Flight Successful." Aurora Flight Sciences Press Release, Jul. 16, 2003, with linked images. http://www.aurora.aero/news/APR-148.html; 9 pages.

GoldenEye-50 Transition Images. Apr. 26, 2005; further depicts GoldenEye-50 as disclosed in Garamone; http://www.aurora.aero/GE50/images/GE-transition.jpg; ; 2 pages.

Notification of Transmittal of the International Search Report and the Written Opinion, the International Search Report, and the Written Opinion for International Application No. PCT/US05/33000; mailed Jun. 28, 2007; 15 pages.

"International Preliminary Report on Patentability"; PCT/US2005/033000; Jul. 26, 2007; 12 Pages.

Dr. Edward T. Smith; "Near-Term Demonstrations of GoldenEye-50 UAV with Options for Advanced Features"; Aurora Flight Sciences Corp.; Jun. 30, 2004; 5 pages.

"GoldenEye-50: A Proposal to Lockheed Martin; Aurora Proposal No. AP04-026"; Aurora Flight Sciences Corp.; Jun. 4, 2004; 12 pages.

Greg Slabodkin; "GoldenEye-100 UAV Successfully Completes Initial Flight Test Program"; Aurora Flight Sciences Corp. Press Release, APR-153; Apr. 7, 2004; 1 page, www.aurora.aero.

Dr. Edward T. Smith; "Feb. 12, 2004 Demonstration Summary: Reference to Proposal No. AP04-018"; Aurora Flight Sciences Corp.; Feb. 23, 2004; 5 pages.

"DARPA Heterogeneous Urban RSTA Team (HURT) Program: A Proposal in Response to Raytheon RFP REB012404.01; Aurora Proposal No. AP04-014"; Aurora Flight Sciences Corp.; Feb. 6, 2004; 19 pages.

"An Advanced Low-Observable UAV System For Remote Sensor Deployment: Aurora Proposal No. AP04-001"; Aurora Flight Sciences Corp.; Jan. 15, 2004; 21 pages.

Greg Slabodkin; "Aurora Announces Plans for GoldenEye-50 Unmanned Aerial Vehicle: VTOL Design Provides Versatile Tool for Homeland Security Applications"; Aurora Flight Sciences Corp. Press Release, APR-150; Dec. 4, 2003; 2 pages; www.aurora.aero.

"2nd AIAA Unmanned Unlimited Systems, Technologies, and Operations—Aerospace, Land, and Sea Conference and Workshop & Exhibit: Event Agenda"; AIAA—American Institute of Aeronautics and Astronautics; Sep. 16, 2003; 6 pages; http://www.aiaa.org/agenda.cfm?lumeetingid=834&viewcon=agenda&pageview=2&programSeeview=1&dateget=16-Sep-03.html.

Carl G. Schaefer, Jr., et al.; "GoldenEye: The Clandestine UAV"; American Institute of Aeronautics and Astronautics; Sep. 16, 2003; 11 pages.

Dr. Edward T. White; "Golden Eye's First Flight Successful: Aurora Demonstrates Potential for a New Breed of Unmanned Aircraft"; Aurora Flight Sciences Corp. Press Release, APR-148; Sep. 8, 2003, 8 pages (with photos downloaded from website); http://aurora_aero/news/apr-148.html.

Jim Garamone; "UAVs Demonstrate the Future at Pax River Event"; American Forces Information Service News Articles, United States Department of Defense; Jul. 14, 2003; 7 pages (with photos downloaded from website); http://www.defenselink.mil/news/Jul2003/n07142003_200307144.html.

"GoldenEye-50 System Information Sheet"; Aurora Flight Sciences Corp.; Jul. 2003; 2 pages.

T. M. Harris et al.; "Theoretical Investigation of Torsion Free Wing Flutter Models"; Air Force Flight Dynamics Laboratory Director of Science & Technology Air Force Systems Command; AFFDL-TM-76-93-FBR; Aug. 1976; 72 Pages.

W. M. Moseley, Jr. et al.; "Stress and Weight Analysis of a Torsionally Free Wing System"; General Dynamics-Convair Aerospace Division; ERR-FW-1446; Jul. 15, 1973; 57 Pages.

W. J. Moran; "ATF/TFW Feasibility Study—Performance Analyses"; General Dynamics-Convair Aerospace Division; ERR-FW-1459; Dec. 31, 1973; 19 Pages.

I. C. Bhateley; "An Investigation of the Interference Effects Between Fuselage and Wing at High Relative Incidence"; General Dynamics-Convair Aerospace Division; ERR-FW-1464; Dec. 31, 1973; 70 Pages.

G. T. Joyce; "The Stability and Control Characteristics of a Torsion Free Wing Advanced Tactical Fighter"; General Dynamics-Convair Aerospace Division; ERR-FW-1451; Dec. 31, 1973; 50 Pages.

Notification of Transmittal of the International Search Report and the Written Opinion, the International Search Report, and the Written Opinion for International Application No. PCT/US05/33231; mailed Aug. 8, 2007; 8 pages.

Athena Controls; GuideStar 111m; http://www.athenati.com/products_services/services/guidestar_gs-111m, 2 pages.

Athena Controls; GuideStar Flies on GoldenEye-50, Apr. 26, 2005; 1 Page; http://www.athenati.com/news/press_releases/april_26_2005.

"International Preliminary Report on Patentability"; PCT/US2005/033231; Sep. 20, 2007; 2 Pages.

* cited by examiner

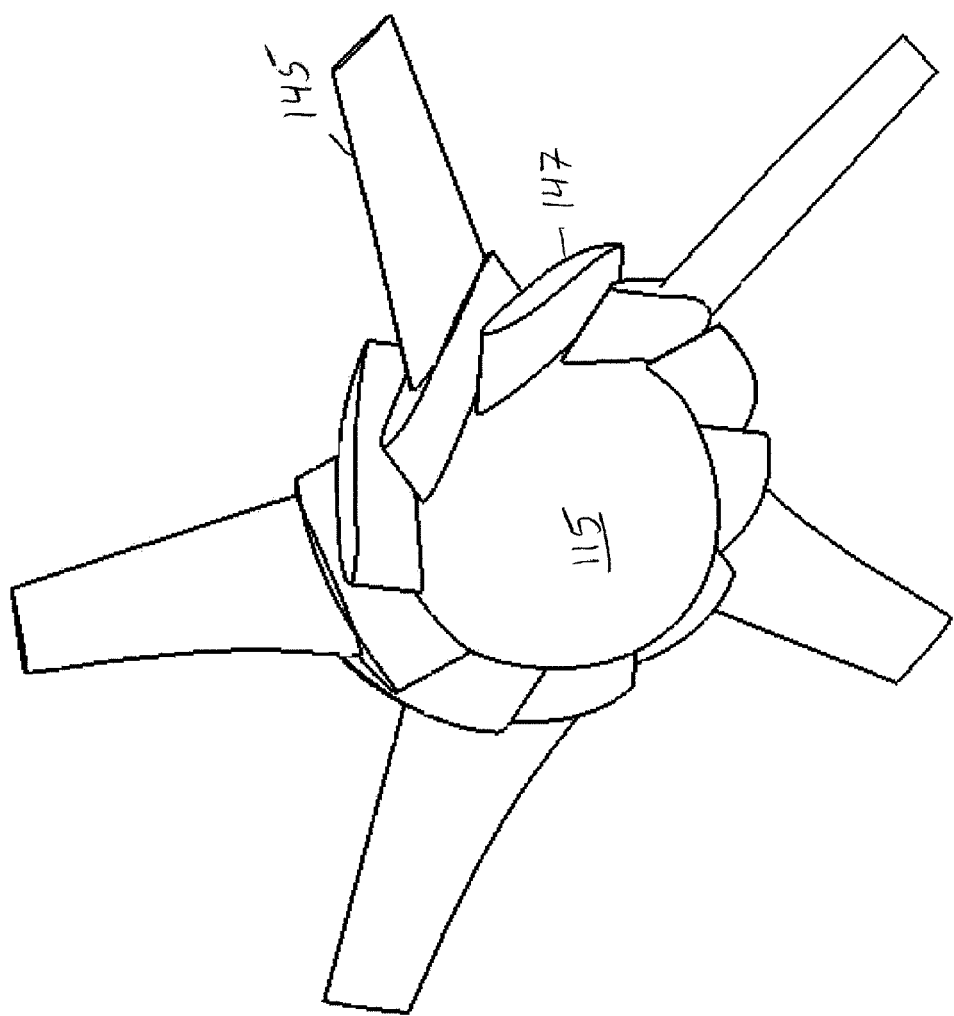

US 7,559,191 B2

DUCTED SPINNER FOR ENGINE COOLING

This application claims priority under 35 U.S.C. § 119(e) to U.S. Provisional Application No. 60/610,570, filed on Sep. 17, 2004, the entire contents of which are hereby incorporated by reference herein.

BACKGROUND

1. Field of the Invention

The present invention relates to ducted fans. More particularly, the present invention relates to a ducted spinner for engine cooling in an aircraft, such as a ducted fan aircraft.

2. Background Information

In many conventional ducted fan aircraft, such as vertical takeoff and landing (VTOL) ducted fan aircraft, there is a need to have a relatively bulky air cooled engine in very close proximity to the fan rotor. While the propulsion fan provides a very high airflow speed past the engine, there are significant thrust losses involved. In conventional air cooled engine installations, the engine drives a propeller that produces significantly lower air speeds, so the losses are much less critical. In addition, for minimizing the drag, it is desirable to use a smoothly diverging duct between the cooling air inlet scoops and the engine. The duct decelerates the high speed external air flow down to the appropriate speed to pass it through the engine fins.

However, for ducted fan propulsion systems, there is very little length between the fan and the engine to install such a duct. Making the duct short enough to fit will result in separated airflow and very high drag losses. In some cases, a long crankshaft is used to provide more spacing between the fan and the engine. However, such a configuration adds weight to the system, and, in many cases, also results in an increase in the duct length, which adds even more weight.

SUMMARY OF THE INVENTION

A ducted spinner for cooling an aircraft engine is disclosed. In accordance with exemplary embodiments of the present invention, according to a first aspect of the present invention, a system for cooling an engine of an aircraft, wherein the engine drives a ducted fan, includes a first nacelle surrounding the engine and a second nacelle substantially concentrically surrounding the first nacelle. The system includes a first spinner coupled around a base of a rotor of the ducted fan and a second spinner substantially concentrically surrounding the first spinner and configured to form a duct between the first and second spinners. The second spinner includes an opening configured to allow air to flow into the duct between the first and second spinners for cooling the engine. The rotor includes a plurality of airfoils penetrating through the first and second spinners. Each of the plurality of airfoils includes a first portion located in the duct between the first and second spinners, and a second portion located between the second spinner and a fuselage of the ducted fan. The first portions of the plurality of airfoils are configured to provide cooling airflow over the engine and structural support for the second portions. The second portions of the plurality of airfoils are configured to provide thrust for the aircraft.

According to the first aspect, a diameter of the first spinner can be substantially equivalent to a diameter of the first nacelle. A diameter of the second spinner can be larger than a diameter of the second nacelle. The first nacelle can extend substantially aft of the engine. The opening in the second spinner can include an edge radius configured to allow substantially smooth airflow into the duct between the first and second spinners. An aft flange of the second spinner can be configured to overlap a fore end of the second nacelle to form a gap. The width of the gap is configured to restrict an amount of cooling airflow through the gap. A cross-sectional area of the first spinner can be configured to vary along an axial length of the first spinner. The varying cross-sectional area of the first spinner can be configured to decelerate the cooling airflow from a flight airflow speed to an engine cooling airflow speed for cooling the engine. The shape of an aft of the second nacelle can be configured to increase pressure of the cooling airflow exiting through the duct between the first and second spinners to be substantially equivalent to an air pressure of airflow exiting the ducted fan. A pitch of the first portion of the plurality of airfoils can be lower than a pitch of the second portion of the plurality of airfoils. A cross-sectional area of the first portions of the plurality of airfoils can be larger than a cross-sectional area of the second portions of the plurality of airfoils to provide the structural support for the second portions.

According to the first aspect, the system can include a plurality of cooling airfoils coupled to the first spinner and interspersed among the first portions of the plurality of airfoils. Shapes of the first and second spinners can be configured to provide an increase in an area of the duct between the first and second spinners as the cooling airflow passes through the duct. The cooling airflow through the duct can exit through a gap between the first and second nacelles aft of the engine. An area of the gap can be configured to provide a speed of the cooling airflow exiting the gap that is substantially equivalent to a speed of an airflow exiting the ducted fan. The shape of an aft of the first nacelle can be configured to contract aft of the engine to provide a speed of the cooling airflow exiting the duct that is higher than a speed of an airflow exiting the ducted fan. The engine can be located in substantially proximity to the rotor.

According to a second aspect of the present invention, an air-cooling system for an engine of an aircraft includes a ducted fan including a ducted fan rotor. The engine drives the ducted fan rotor. The ducted fan includes a first enclosure surrounding the engine and a second enclosure substantially concentrically surrounding the first enclosure. The ducted fan includes a first spinner coupled around a base of the ducted fan rotor, and a second spinner substantially concentrically surrounding the first spinner and configured to form a channel between the first and second spinners. The second spinner includes an opening configured to allow air to flow into the channel between the first and second spinners for cooling the engine. The ducted fan rotor includes a plurality of blades passing through the first and second spinners. Each of the plurality of blades includes a first portion located in the channel between first and second spinners, and a second portion located between the second spinner and an interior wall of the ducted fan. The first portions of the plurality of blades can be configured to provide cooling airflow over the engine and structural support for the second portions. The second portions of the plurality of blades can be configured to propel the aircraft.

According to the second aspect, a diameter of the first spinner can be substantially equivalent to a diameter of the first enclosure. A diameter of the second spinner can be larger than a diameter of the second enclosure. The first enclosure can extend substantially aft of the engine. The opening in the second spinner can include an edge radius configured to allow substantially smooth airflow into the channel between the first and second spinners. An aft flange of the second enclosure can be configured to overlap a fore end of the second enclosure to form a slit. The width of the slit can be configured to restrict an amount of cooling airflow through the slit. A cross-sectional area of the first spinner can be configured to vary along an axial length of the first spinner. The varying cross-sectional area of the first spinner can be configured to decelerate the cooling airflow from a flight airflow speed to an engine cooling airflow speed for cooling the engine. The second enclosure can be configured to increase pressure of the cooling airflow exiting through the channel between the first and second spinners to be substantially equivalent to an air pressure of airflow exiting the ducted fan. A pitch of the first portion of the plurality of blades can be lower than a pitch of the second portion of the plurality of blades. A cross-sectional area of the first portions of the plurality of blades can be larger than a cross-sectional area of the second portions of the plurality of blades to provide the structural support for the second portions.

According to the second aspect, the system can include a plurality of cooling blades coupled between the first and second spinners and interspersed among the first portions of the plurality of blades. The first and second spinners can be configured to provide an increase in an area of the channel between the first and second spinners as the cooling airflow passes through the channel. The cooling airflow through the channel can exit through a slit between the first and second enclosures aft of the engine. An area of the slit can be configured to provide a speed of the cooling airflow exiting the slit that is substantially equivalent to a speed of an airflow exiting the ducted fan. The first enclosure can be configured to contract aft of the engine to provide a speed of the cooling airflow exiting the channel that is higher than a speed of an airflow exiting the ducted fan. The engine can be located in substantially proximity to the ducted fan rotor.

According to a third aspect of the present invention, a system for cooling an engine of an aircraft, wherein the engine drives a ducted fan means, includes a first enclosure means for surrounding the engine and a second enclosure means for substantially concentrically surrounding the first enclosure means. The system includes a first means for spinning coupled around a base of a rotor means of the ducted fan means, and a second means for spinning substantially concentrically surrounding the first spinning means and configured to form a duct between the first and second spinning means. The second spinning means includes an opening configured to allow air to flow into the duct between the first and second spinning means for cooling the engine. The rotor means includes a plurality of airfoil means penetrating through the first and second spinning means. Each of the plurality of airfoil means includes a first portion located in the duct between first and second spinning means, and a second portion located between the second spinning means and an interior of the ducted fan means. The first portions of the plurality of airfoil means are configured to provide cooling airflow over the engine and support for the second portions. The second portions of the plurality of airfoil means are configured to propel the aircraft.

According to the third aspect, a diameter of the first spinning means can be substantially equivalent to a diameter of the first enclosure means. A diameter of the second spinning means can be larger than a diameter of the second enclosure means. The first enclosure means can extend substantially aft of the engine. The opening in the second spinning means can include an edge radius configured to allow substantially smooth airflow into the duct between the first and second spinning means. An aft flange of the second enclosure means can be configured to overlap a fore end of the second enclosure means to form a gap. The width of the gap can be configured to restrict an amount of cooling airflow through the gap. A cross-sectional area of the first spinning means can be configured to vary along an axial length of the first spinning means. The varying cross-sectional area of the first spinning means can be configured to decelerate the cooling airflow from a flight airflow speed to an engine cooling airflow speed for cooling the engine. The shape of an aft end of the second enclosure means can be configured to increase pressure of the cooling airflow exiting through the duct between the first and second spinning means to be substantially equivalent to an air pressure of airflow exiting the ducted fan means. A pitch of the first portion of the plurality of airfoil means can be lower than a pitch of the second portion of the plurality of airfoil means. A cross-sectional area of the first portions of the plurality of airfoil means can be larger than a cross-sectional area of the second portions of the plurality of airfoil means to provide the support for the second portions.

According to the third aspect, the system can include a plurality of cooling airfoil means coupled to the first spinning means and interspersed among the first portions of the plurality of airfoil means. Shapes of the first and second spinning means can be configured to provide an increase in an area of the duct between the first and second spinning means as the cooling airflow passes through the duct. The cooling airflow through the duct can exit through a gap between the first and second enclosure means aft of the engine. An area of the gap can be configured to provide a speed of the cooling airflow exiting the gap that is substantially equivalent to a speed of an airflow exiting the ducted fan means. The shape of an aft of the first enclosure means can be configured to contract aft of the engine to provide a speed of the cooling airflow exiting the duct that is higher than a speed of an airflow exiting the ducted fan means. The engine can be located in substantially proximity to the rotor means.

According to a fourth aspect of the present invention, an air-cooling system for an engine of an aircraft includes a ducted fan means comprising a ducted fan rotor means. The engine drives the ducted fan rotor means. The ducted fan means includes a first means for surrounding the engine, and a second means for substantially concentrically surrounding the first surrounding means. The ducted fan means includes a first means for spinning coupled around a base of the ducted fan rotor means, and a second means for spinning substantially concentrically surrounding the first spinning means and configured to form a channel between the first and second spinning means. The second spinning means includes an opening configured to allow air to flow into the channel between the first and second spinning means for cooling the engine. The ducted fan rotor means includes a plurality of means for propelling the aircraft passing through the first and second spinning means. Each of the plurality of propelling means includes a first portion located in the channel between first and second spinning means, and a second portion located between the second spinning means and an interior wall of the ducted fan means. The first portions of the plurality of propelling means are configured to provide cooling airflow over the engine and support for the second portions. The second portions of the plurality of propelling means are configured to provide thrust for the aircraft.

According to the fourth aspect, a diameter of the first spinning means can be substantially equivalent to a diameter of the first surrounding means. A diameter of the second spinning means can be larger than a diameter of the second surrounding means. The first surrounding means can extend substantially aft of the engine. The opening in the second spinning means can include an edge radius configured to allow substantially smooth airflow into the channel between the first and second spinning means. An aft flange of the second surrounding means can be configured to overlap a fore end of the second surrounding means to form a slit. The width of the slit can be configured to restrict an amount of cooling airflow through the slit. A cross-sectional area of the first spinning means can be configured to vary along an axial length of the first spinning means. The varying cross-sectional area of the first spinning means can be configured to decelerate the cooling airflow from a flight airflow speed to an engine cooling airflow speed for cooling the engine. The second surrounding means can be configured to increase pressure of the cooling airflow exiting through the channel between the first and second spinning means to be substantially equivalent to an air pressure of airflow exiting the ducted fan means. A pitch of the first portion of the plurality of propelling means can be lower than a pitch of the second portion of the plurality of propelling means. A cross-sectional area of the first portions of the plurality of propelling means can be larger than a cross-sectional area of the second portions of the plurality of propelling means to provide the support for the second portions.

According to the fourth aspect, the system can include a plurality of means for directing cooling airflow coupled between the first and second spinning means and interspersed among the first portions of the plurality of propelling means. The first and second spinning means can be configured to provide an increase in an area of the channel between the first and second spinning means as the cooling airflow passes through the channel. The cooling airflow through the channel can exit through a slit between the first and second surrounding means aft of the engine. An area of the slit can be configured to provide a speed of the cooling airflow exiting the slit that is substantially equivalent to a speed of an airflow exiting the ducted fan means. The first surrounding means can be configured to contract aft of the engine to provide a speed of the cooling airflow exiting the channel that is higher than a speed of an airflow exiting the ducted fan means. The engine can be located in substantially proximity to the ducted fan rotor means.

According to a fifth aspect of the present invention, a method of cooling an engine of an aircraft, wherein the engine drives a ducted fan, includes the steps of: surrounding the engine with a first nacelle; substantially concentrically surrounding the first nacelle with a second nacelle; coupling a first spinner around a base of a rotor of the ducted fan; substantially concentrically surrounding the first spinner with a second spinner to form a duct between the first and second spinners, wherein the second spinner includes an opening; arranging a plurality of blades of the rotor to penetrate through the first and second spinners, wherein each of the plurality of blades includes a first portion located in the duct between first and second spinners, and a second portion located between the second spinner and an interior wall of the ducted fan, and wherein the second portions of the plurality of blades provide thrust for the aircraft; and directing cooling airflow through the opening in the second spinner into the duct between the first and second spinners for cooling the engine, wherein the first portions of the plurality of blades provide cooling airflow over the engine and structural support for the second portions.

According to the fifth aspect, a diameter of the first spinner can be substantially equivalent to a diameter of the first nacelle. A diameter of the second spinner can be larger than a diameter of the second nacelle. The first nacelle can extend substantially aft of the engine. The opening in the second spinner can include an edge radius for allowing substantially smooth airflow into the duct between the first and second spinner. An aft flange of the second spinner can overlap a fore end of the second nacelle to form a gap. The method can include the steps of: restricting an amount of cooling airflow through the gap; varying a cross-sectional area of the first spinner along an axial length of the first spinner; decelerating the cooling airflow from a flight airflow speed to an engine cooling airflow speed for cooling the engine; and increasing pressure of the cooling airflow exiting through the duct between the first and second spinners to be substantially equivalent to an air pressure of airflow exiting the ducted fan. A pitch of the first portions of the plurality of blades can be lower than a pitch of the second portions of the plurality of blades. A cross-sectional area of the first portions of the plurality of blades can be larger than a cross-sectional area of the second portions of the plurality of blades to provide the structural support for the second portions.

According to the fifth aspect, the method can include the steps of: interspersing a plurality of cooling airfoils among the first portions of the plurality of blades coupled to the first spinner; decreasing an area of the duct between the first and second spinners as the cooling airflow passes through the duct; and forming a gap between the first and second nacelle aft of the engine through which cooling airflow exits from the duct, wherein an area of the gap can provide a speed of the cooling airflow exiting the gap that is substantially equivalent to a speed of an airflow exiting the ducted fan. An aft of the first nacelle can be contracted aft of the engine to provide a speed of the cooling airflow exiting the duct that is higher than a speed of an airflow exiting the ducted fan. The method can include the step of: arranging the engine in substantially proximity to the rotor.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 8 is a diagram illustrating a cut-away oblique view of a system for cooling a ducted fan engine of an aircraft, wherein a plurality of cooling airfoils are coupled to a first spinner of the ducted fan engine, and are interspersed among first portions of a plurality of airfoils, in accordance with an exemplary embodiment of the present invention.

DETAILED DESCRIPTION OF THE PREFERRED EMBODIMENTS

Figure 1:
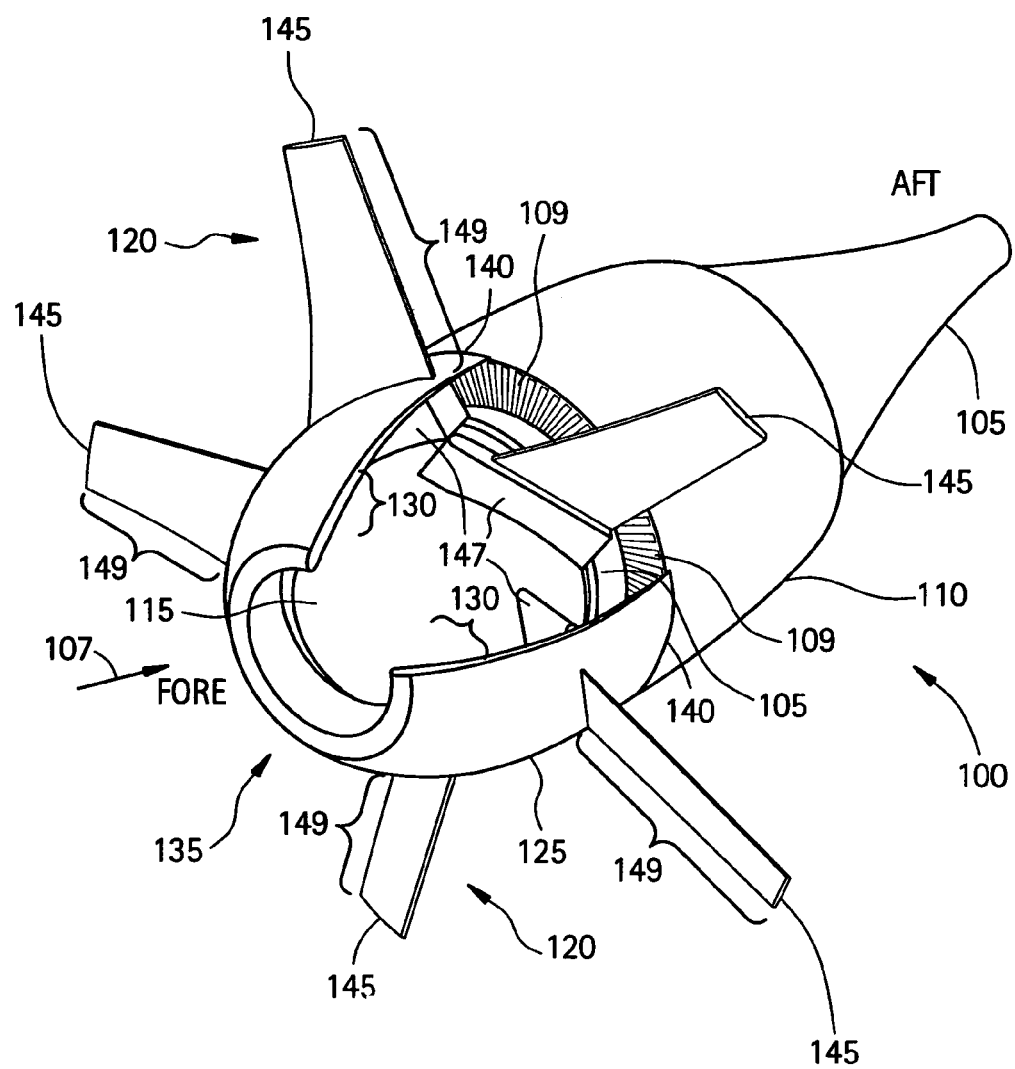
FIG. 1 is a diagram illustrating cut-away, oblique view of a system for cooling an engine of an aircraft, in accordance with an exemplary embodiment of the present invention.

Exemplary embodiments of the present invention are directed to a ducted spinner system for cooling an engine of aircraft, such as, for example, a ducted fan aircraft, a vertical takeoff and landing (VTOL) aircraft or any other suitable type of ducted fan or aircraft. According to exemplary embodiments, a ducted fan rotor is connected to the shaft of an air cooled engine, and in proximity to the engine. An inner nacelle is located around the crank case of the engine to direct the air into the engine cooling fins. The inner nacelle extends past the engine. A substantially circular outer nacelle concentrically surrounds the inner nacelle, and can be shorter in length than the inner nacelle. An inner spinner is located around the base of the fan rotor. The diameter of the inner spinner substantially matches the diameter of the inner nacelle. An outer spinner is located around the inner spinner. The diameter of the outer spinner is slightly larger than the diameter of the outer nacelle. The spacing between the inner and outer spinners forms a duct through which cooling airflow can pass. The cooling air can flow through the duct, over the engine, and exit through a gap between the inner and outer nacelles aft of the engine.

According to exemplary embodiments, an aft flange of the outer spinner can overlap the outer nacelle slightly so that there is no contact, but only a small slot is maintained, thus minimizing the amount of air that can flow though the slot. The fan blades of the rotor can penetrate both the inner and outer spinners, and are sealed to each. Outside the outer spinner, the fan blades can be shaped for appropriate production of thrust. In the duct between the spinners, the fan blades can have a cross-sectional area appropriate to structurally support the outer portions of the fan blades (e.g., the portions of the fan blades extending outside the outer spinner). An opening at the front of the outer spinner can be configured to allow cooling air to flow into the duct created between the inner and outer spinners. The edge of the opening can have an appropriate leading edge radius that is configured to allow the airflow to enter the duct smoothly. The shape of the inner spinner can be configured such that the duct has a varying cross-sectional area along its length. The variation in cross-sectional area over the length of the duct can be configured to appropriately decelerate the incoming airflow from a flight speed condition down to the appropriate speed to pass the air through the engine cooling fins.

According to exemplary embodiments, the structural part of the fan blades that pass through the cooling duct (e.g., the portions of the fan blades located between the inner and outer spinners) can be surrounded by a non-structural airfoil shape. The non-structural airfoil shape can be configured to appropriately pump the cooling air through the engine. The non-structural airfoil shape can also be configured to provide a sufficient pressure rise such that the total pressure of the air exiting the engine cooling duct is substantially the same as the total pressure in the main duct flow. Due to the low axial air flow speed at the end of the diverging duct in the spinner, these inner, structural fan blades (e.g., the portion of the fan blades located between the inner and outer spinners) can have lower pitch and more blade area than the outer fan blades (e.g., the portions of the fan blades located externally to the outer spinner). According to an alternative exemplary embodiment, additional cooling fan blades can be added in between the fan blades surrounding the roots of the outer fan blades.

According to exemplary embodiments, the inner and outer nacelles can be shaped such that there is an area contraction in the duct between the nacelles as the cooling airflow proceeds aft of the engine. The air can exit through a gap between the inner and outer nacelles located aft of the engine. The area of such gap can be selected such that the cooling air flows at approximately the same speed as the main duct flow, thus minimizing disturbances and providing maximum thrust. If the aft body portion of the inner nacelle is contracted rapidly aft of the engine, the cooling fan design and the duct exit area can be configured to provide a higher axial speed to the airflow than the main duct flow. Such a higher-energy flow can stay attached to a short aft center nacelle better than a lower energy flow.

Figure 7:
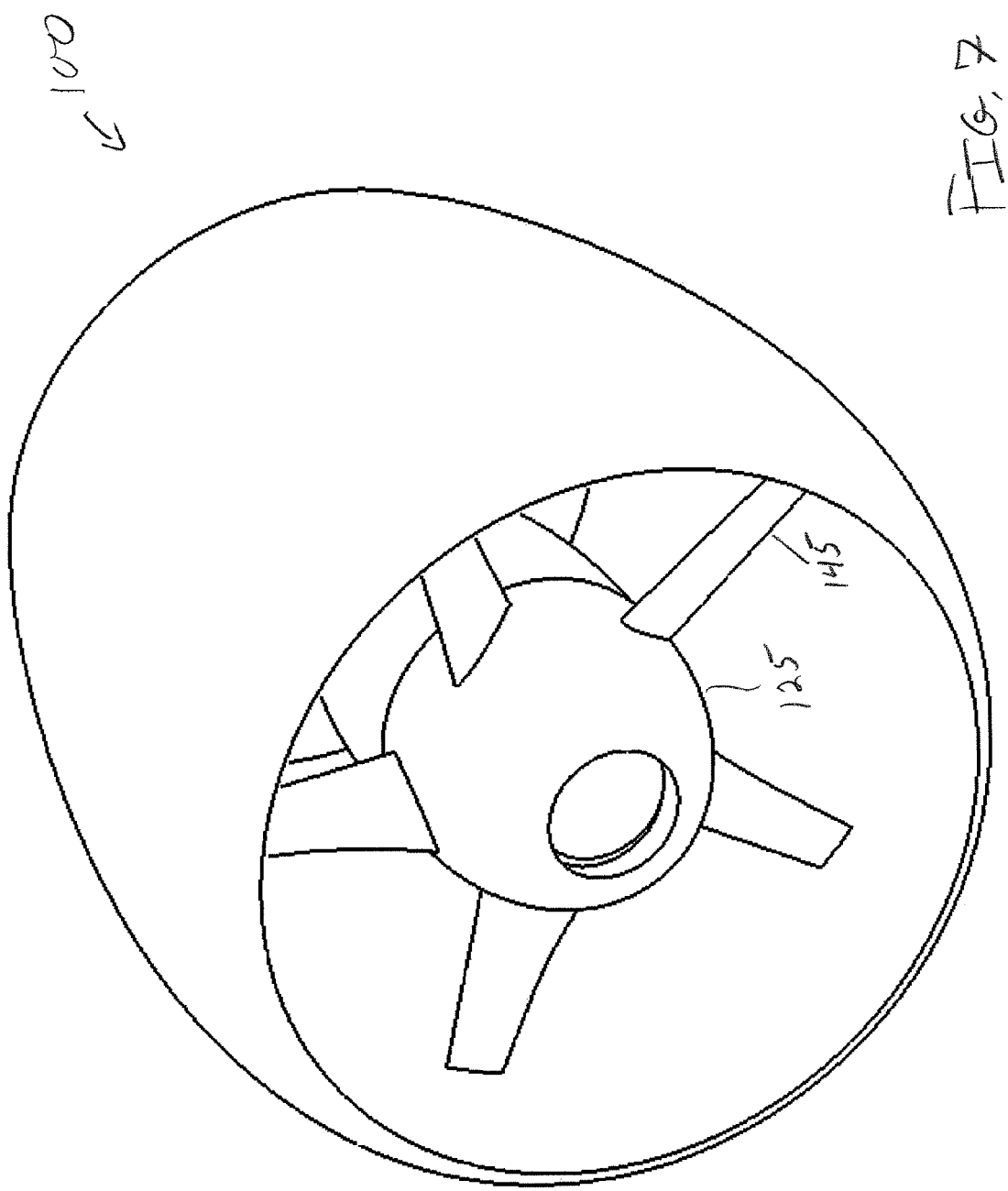
FIG. 7 is a diagram illustrating an oblique view of a system for cooling a ducted fan engine of an aircraft, in accordance with an exemplary embodiment of the present invention.

These and other aspects of the present invention will now be described in greater detail. FIG. 1 is a diagram illustrating cut-away, oblique view of a system 100 for cooling an engine of an aircraft, in accordance with an exemplary embodiment of the present invention, and FIG. 7 is a diagram illustrating an oblique view of a system 100 for cooling a ducted fan engine of an aircraft, in accordance with an exemplary embodiment of the present invention. The system 100 includes a first or inner nacelle 105. The inner nacelle 105 is configured to substantially surround the engine. For example, the inner nacelle 105 can substantially surround the crank case of the engine and be configured to direct air flow 107 into the engine cooling fins 109. According to an exemplary embodiment, the inner nacelle 105 can extend substantially aft of the engine. The system 100 includes a second or outer nacelle 110 that is configured to substantially concentrically surround the inner nacelle 105. For purpose of illustration and not limitation, as illustrated in FIG. 1, the length of the outer nacelle 110 can be less than the length of the inner nacelle 105. However, the outer nacelle 110 can be of any suitable length to substantially concentrically surround the inner nacelle 105. Each of the inner and outer nacelles 105 and 110 can be substantially circular in circumference or other suitable shape.

The system 100 includes a first or inner spinner 115 that is coupled to or otherwise attached around a base of a rotor 120 of the ducted fan. According to an exemplary embodiment, the diameter of the inner spinner 115 can be substantially equivalent to the diameter of the inner nacelle 105, although the inner spinner 115 can have any suitable diameter relative to the inner nacelle 105. The rotor 120 is connected or otherwise coupled to the shaft of the engine, and the engine is configured to drive or otherwise spin or rotate the rotors 120 to drive the ducted fan. According to an exemplary embodiment, the rotor 120 can be located proximate to the engine. For example, the rotor 120 can be located substantially close to the engine, although the rotor 120 can be located at any suitable distance from the engine.

The system 100 also includes a second or outer spinner 125 that is configured to substantially concentrically surround the inner spinner 115. The outer spinner 125 is also configured to form a duct 130 between the inner and outer spinners 115 and 125. The outer spinner 125 includes an opening 135 that is configured to allow airflow 107 into the duct 130 for cooling the engine. According to an exemplary embodiment, the diameter of the outer spinner 125 can be slightly larger than the diameter of the outer nacelle 110, although the outer spinner 125 can have any suitable diameter relative to the outer nacelle 110. For example, an aft flange 140 of the outer spinner 125 can be configured to slightly overlap the fore end of the outer nacelle 110 so that there is no contact, but a substantially narrow slot or slit is maintained, thereby minimizing the amount of airflow 107 that can flow through the slot. In other words, the width between the aft flange 140 of the outer spinner 125 and the outer nacelle 110 can be configured to be substantially small or otherwise narrow to restrict or otherwise minimize the amount of airflow 107 through the slot.

The rotor 120 includes a plurality of airfoils or fan or rotor blades 145 that penetrate through the inner and outer spinners 115 and 125, and can be sealed to each of the inner and outer spinners 115 and 125. Each of the rotor blades 145 includes a first or inner portion 147 that is located within the duct 130. Each of the rotor blades 145 includes a second or outer portion 149 located externally to the outer spinner 125 (e.g., between the outer spinner 125 and the interior of the fuselage of the ducted fan aircraft). According to exemplary embodiments, the inner portions 147 of each of the rotor blades 145 are configured to provide cooling airflow 107 over the engine and structural support for the corresponding outer portions 149 of each rotor blade 145. In other words, the cross-sectional area of the inner portions 147 of each rotor blade 145 can be larger than the cross-sectional area of the outer portions 149 of each rotor blade 145 to provide the structural support for the outer portions 149. Thus, the inner portions 147 of each rotor blade 145 can be configured to have a suitable cross-sectional area to structurally support the outer portions 149 of each rotor blade 145. The outer portions 149 of each rotor blade 145 are configured to provide thrust for the aircraft. Accordingly, the corresponding pitch of the inner portions 147 of each rotor blade 145 can be lower than the pitch of the outer portions 149 of each rotor blade 145, although the inner and outer portions 147 and 149 of each rotor blade 145 can be of any suitable pitch.

Figure 2:
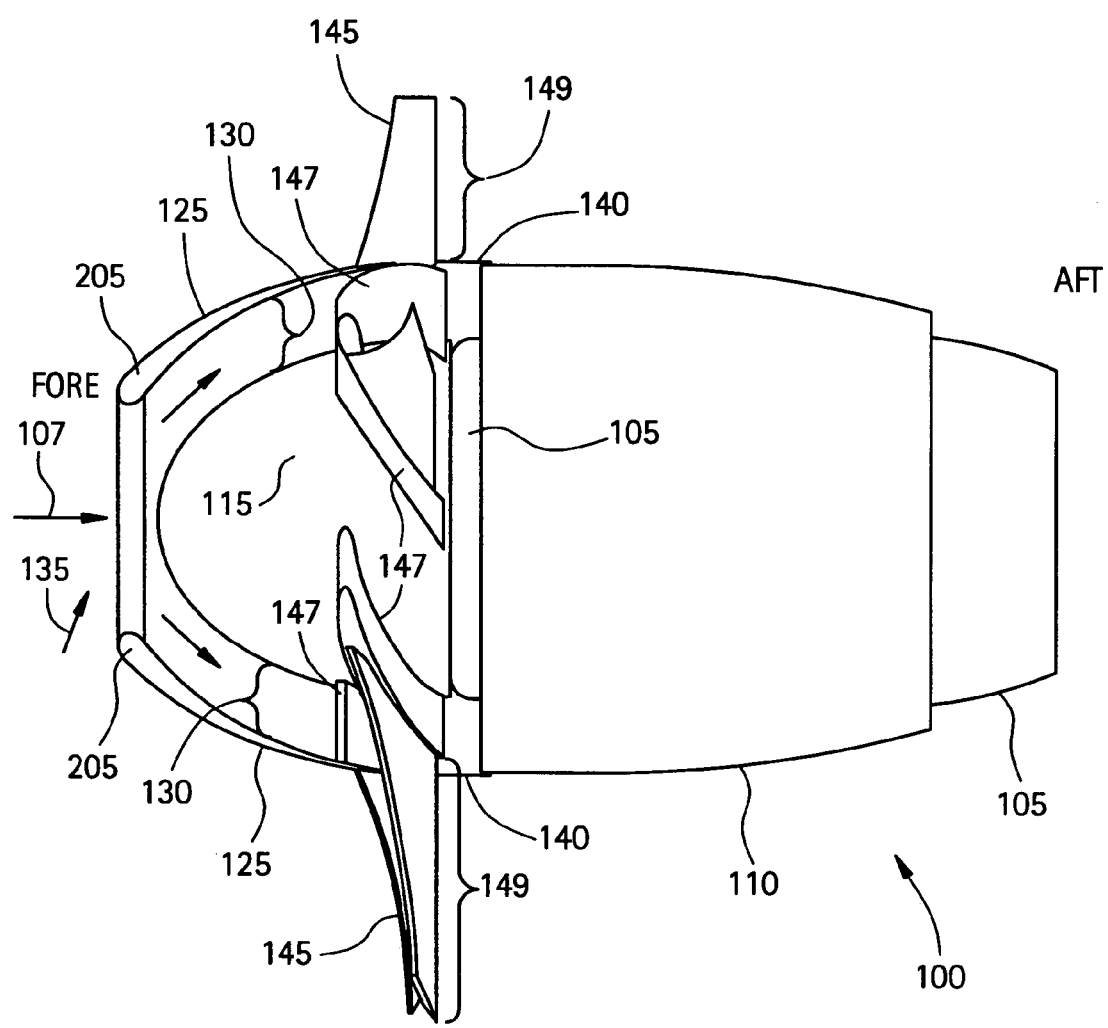
FIG. 2 is a diagram illustrating cut-away, side view of a system for cooling an engine of an aircraft, in accordance with an exemplary embodiment of the present invention.

FIG. 2 is a diagram illustrating cut-away, side view of a system 100 for cooling an engine of an aircraft, in accordance with an exemplary embodiment of the present invention. As discussed previously, the inner spinner 115 and the outer spinner 125 are configured to form the duct 130. Additionally, the opening 135 in the outer spinner 125 is configured to allow airflow 107 into the duct 130 for cooling the engine. The opening 135 in the outer spinner 125 includes a leading edge 205. According to an exemplary embodiment, the leading edge 205 is configured to allow the airflow 107 to enter the duct 130 substantially smoothly. In other words, the leading edge radius of the leading edge 205 is appropriately configured so that disruptions and disturbances to the airflow 107 entering the duct 130 are minimized. For purposes of illustration and not limitation, as illustrated in FIG. 2, the leading edge 205 of the outer spinner 125 can be substantially rounded at the opening 135, with the thickness of the leading edge 205 decreasing as the outer spinner 125 extends aft. However, the leading edge 205 of the outer spinner 125 can comprise any suitable shape or configuration that is capable of allowing the airflow 107 to enter the duct 130 substantially smoothly and with minimal disruptions and disturbances to the entering airflow 107.

According to an exemplary embodiment, the shape of the inner spinner 115 can be configured such that the duct 130 has a varying cross-sectional area along the length of the duct 130. In other words, the cross-sectional area of the inner spinner 115 can be configured to vary along the axial length of the inner spinner 115. For purpose of illustration and not limitation, as illustrated in FIG. 2, the inner spinner 115 can comprise a rounded or dome-like shape or other suitable shape or configuration. For example, the shape of the inner spinner 115 can be configured such that the cross-sectional area of the duct 130 is narrower towards the fore of the ducted fan and widens or otherwise increases as the duct 130 and the inner spinner 115 extend aft. Thus, the shapes of the inner and outer spinners 115 and 125 can be configured to provide an increase in the area of the duct 130 as the airflow 107 passes through the duct 130. The variation in the cross-sectional area of the duct 130 is configured to suitably decelerate the incoming airflow 107 from the flight speed condition down to the appropriate speed to pass through the engine cooling fins 109 of the engine.

Figure 3:
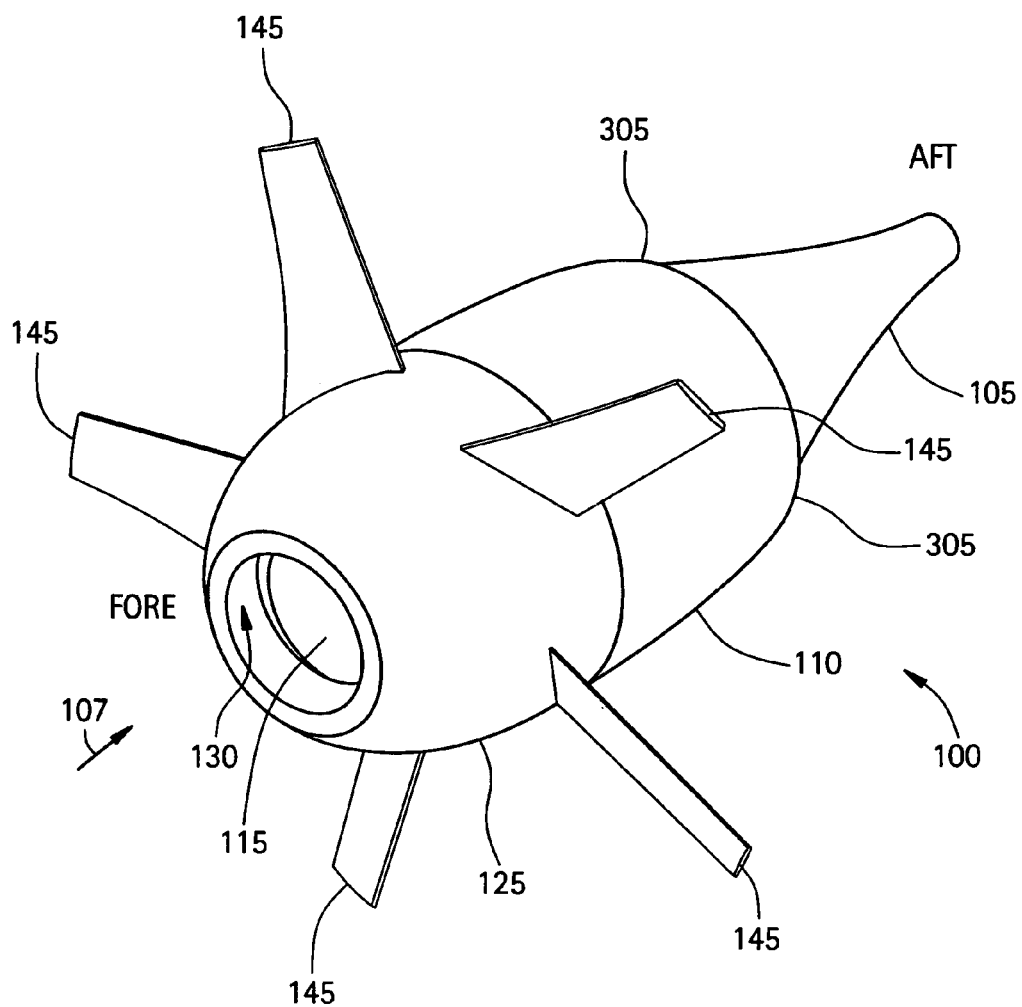
FIG. 3 is a diagram illustrating an oblique view of the system for cooling an engine of an aircraft, in accordance with an exemplary embodiment of the present invention.

According to an exemplary embodiment, the shape of the inner and outer nacelles 105 and 110 can be configured such that there is a contraction in the cross-sectional area of the duct 130 between the inner and outer nacelles 105 and 110 as the cooling airflow 107 proceeds aft of the engine. FIG. 3 is a diagram illustrating an oblique view of the system 100 for cooling an engine of an aircraft, in accordance with an exemplary embodiment of the present invention. As discussed previously, the inner spinner 115 and the outer spinner 125 are configured to form the duct 130. After passing over the engine and through the engine cooling fans, the airflow 107 exits through a gap 305 between the inner and outer nacelles 105 and 110 at the aft of the outer nacelle 110. By varying the width of the gap 305 (e.g., the distance between the inner and outer nacelles 105 and 110 at the location of the gap 305), the speed of the airflow 107 exiting the gap 305 can be altered. According to an exemplary embodiment, the area of the gap 305 can be configured such that the airflow 107 exiting the gap 305 flows at substantially the same speed as the main duct flow (e.g., the air flowing through the duct of the ducted fan over the system 100), thereby minimizing disturbances and providing maximum thrust. Thus, the shape of the aft of the outer nacelle 110 can be configured to increase the pressure of the airflow 107 exiting through the duct 130 at the gap 305 to be substantially equivalent to the air pressure exiting the ducted fan. However, the aft of the outer nacelle 110 can be of any suitable shape or configuration to provide any appropriate speed for the airflow 107 exiting the gap 305.

Figure 4:
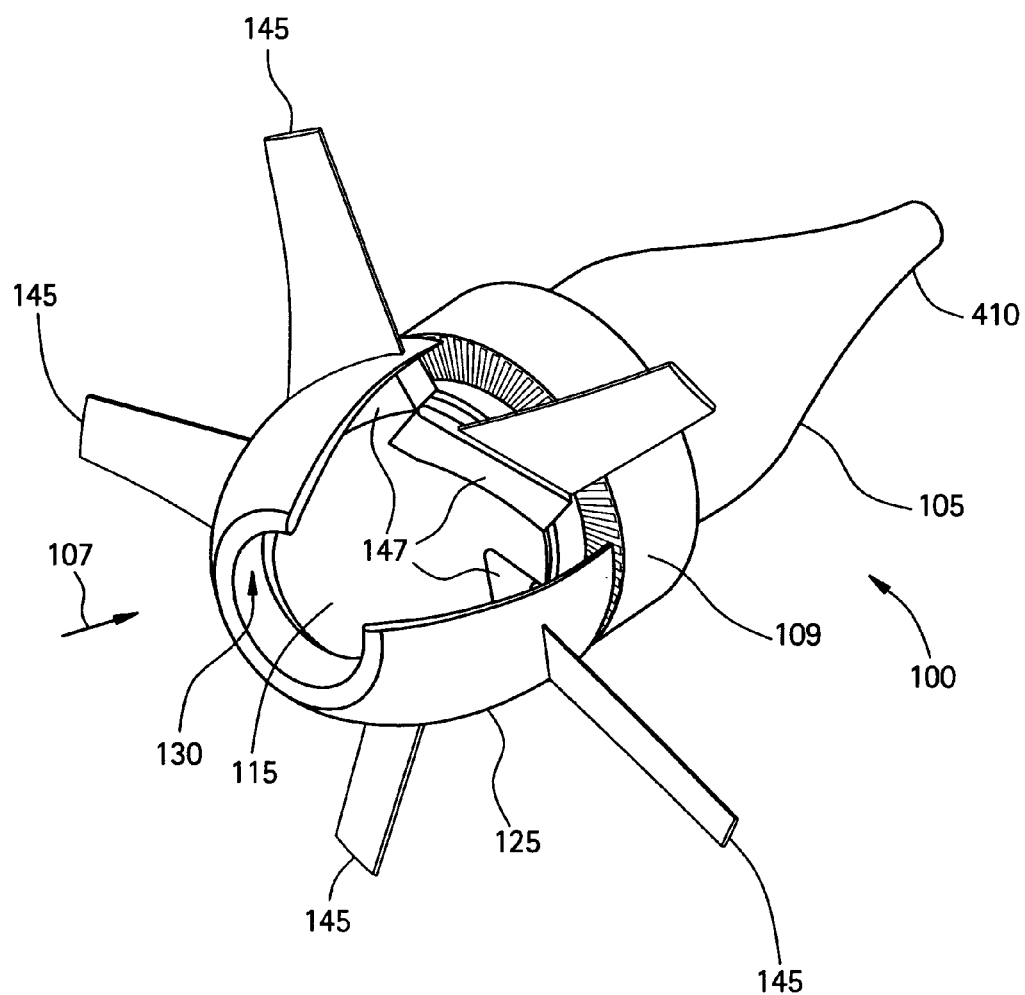
FIG. 4 is a diagram illustrating an oblique, cut-away view of the system for cooling an engine of an aircraft, with the outer nacelle removed, in accordance with an exemplary embodiment of the present invention.

According to an exemplary embodiment, as illustrated in FIG. 3, an aft portion of the inner nacelle 105 can be configured to contract aft of the engine. FIG. 4 is a diagram illustrating an oblique, cut-away view of the system 100 for cooling an engine of an aircraft, with the outer nacelle 110 removed, in accordance with an exemplary embodiment of the present invention. As discussed previously, the gap between the inner nacelle 105 and the aft end of the outer nacelle 110 can be configured to provide a higher axial speed to the airflow 107 exiting the gap than the main duct flow. In other words, the shape of the aft portion 410 of the inner nacelle 105 can be configured to contract aft of the engine to provide a speed of the airflow 107 exiting the duct 130 at the gap that is higher than the speed of the airflow exiting the ducted fan. Such a configuration can provide improved attachment of the higher energy airflow to the aft of the inner nacelle 105 than a lower-energy airflow, thereby minimizing separation of airflow and corresponding drag losses. However, the aft portion 410 of the inner nacelle 105 can have any suitable shape or configuration.

Figure 5:
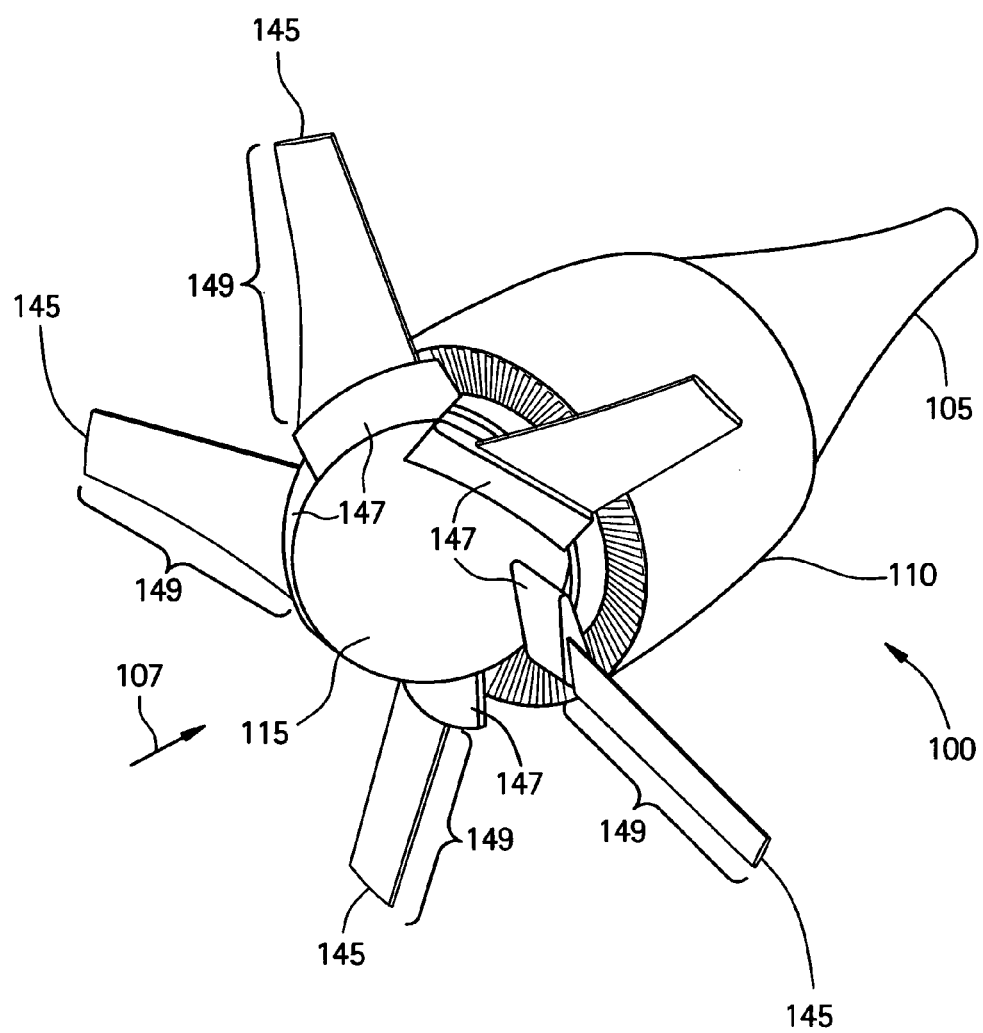
FIG. 5 is a diagram illustrating an oblique, cut-away view of the system for cooling an engine of an aircraft, with the outer spinner removed, in accordance with an exemplary embodiment of the present invention.

FIG. 5 is a diagram illustrating an oblique, cut-away view of the system 100 for cooling an engine of an aircraft, with the outer spinner 125 removed, in accordance with an exemplary embodiment of the present invention. According to an exemplary embodiment, the inner portions 147 of each rotor blade 145 that pass through the duct between the inner and outer spinners can be surrounded by an airfoil shape that is configured to suitably pump the cooling airflow 107 through the engine. Such an airfoil shape can also be configured to provide an appropriate pressure rise such that the total pressure of the airflow 107 exiting the duct is substantially the same as the total pressure in the main duct airflow. Due to the low axial airflow speed at the (aft) end of the duct between the inner and outer spinners 105 and 110 (e.g., at the fore of the outer nacelle 110), the inner portions 147 of each rotor blade 145 can have a pitch that is lower and have more blade area than the outer portions 149 of each rotor blade 145. The airfoil shape of the inner portions 147 of each rotor blade 145, and the pitch of the inner and outer portions 147 and 149 of the rotor blades 145 can depend on such factors as, the amount of cooling airflow 107 that is to pumped over the engine at given speeds, the amount of thrust that the rotor blades 145 are to provide, and other like factors. According to an alternative exemplary embodiment, a plurality of additional cooling airfoils or blades can be coupled to the inner spinner 105 and suitably interspersed between or among the inner portions 147 of the rotor blades 145 to provide additional engine cooling. FIG. 8 is a diagram illustrating a cut-away oblique view of a system for cooling a ducted fan engine 100 of an aircraft, further illustrating a plurality of inner portions (cooling airfoils) 147 that are coupled to an inner (first) spinner 115 of the ducted fan engine, and are interspersed among first portions of a plurality of rotor blades (airfoils) 145, in accordance with various exemplary embodiments.

Figure 6:
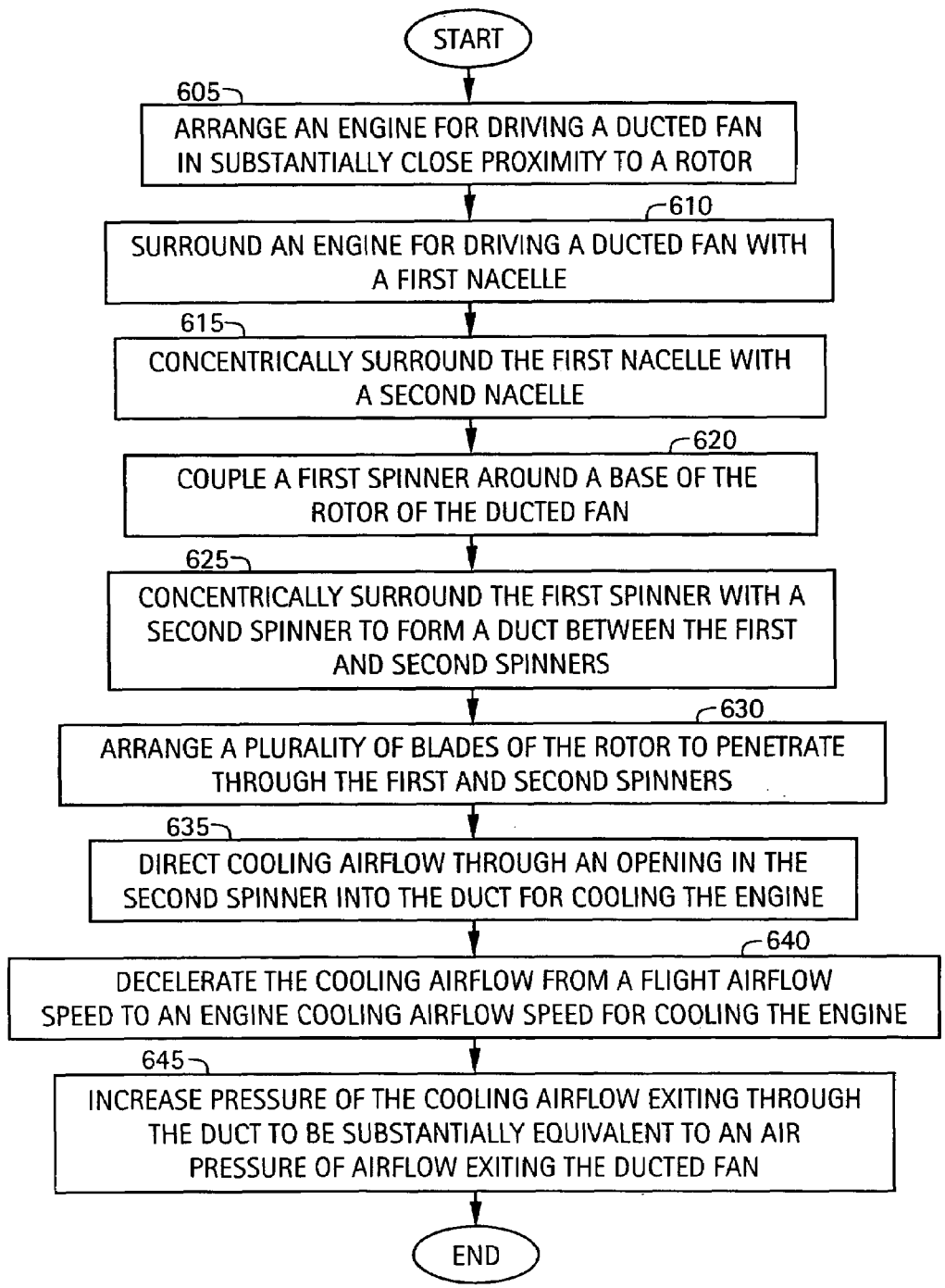
FIG. 6 is a flowchart illustrating steps for cooling an engine of an aircraft, in accordance with an exemplary embodiment of the present invention.

FIG. 6 is a flowchart illustrating steps for cooling an engine of an aircraft, in accordance with an exemplary embodiment of the present invention. In step 605, an engine for driving a ducted fan is arranged in substantially close proximity to a rotor. In step 610, the engine is surrounded with an inner or first nacelle. The first nacelle can extend substantially aft of the engine. In step 615, the first nacelle is substantially concentrically surrounded with an outer or second nacelle. In step 620, a first spinner is coupled around a base of the rotor of the ducted fan. The diameter of the first spinner can be substantially equivalent to the diameter of the first nacelle. According to an exemplary embodiment, the cross-sectional area of the first spinner can be varied along the axial length of the first spinner.

In step 625, the first spinner is substantially concentrically surrounded with a second spinner to form a duct between the first and second spinners. The diameter of the second spinner can be larger than the diameter of the second nacelle. According to an exemplary embodiment, the area of the duct between the first and second spinners can be decreased as the cooling airflow passes through the duct. The second spinner includes an opening. According to an exemplary embodiment, the opening in the second spinner can include an edge radius for allowing substantially smooth airflow into the duct. Additionally, an aft flange of the second spinner can be configured to overlaps a fore end of the second nacelle to form a slot, and the an amount of cooling airflow through the slot can be restricted. Furthermore, a gap can be formed between the first and second nacelles aft of the engine through which cooling airflow exits from the duct. The area of the gap can be configured to provide a speed of the cooling airflow exiting the gap that is substantially equivalent to a speed of an airflow exiting the ducted fan. According to an exemplary embodiment, the aft portion of the first nacelle can be contracted aft of the engine to provide a speed of the cooling airflow exiting the duct that is higher than a speed of an airflow exiting the ducted fan.

In step 630, a plurality of blades of the rotor are arranged to penetrate through the first and second spinners. Each of the plurality of blades includes a first portion located in the duct, and a second portion located between the second spinner and an interior wall of the ducted fan. The first portions of the plurality of blades are configured to provide cooling airflow over the engine and structural support for the second portions of the plurality of blades. Thus, according to an exemplary embodiment, the cross-sectional area of the first portions of the plurality of blades can be larger than the cross-sectional area of the second portions of the plurality of blades to provide the structural support for the second portions. The second portions of the plurality of blades are configured to provide thrust for the aircraft. Thus, according to an exemplary embodiment, a pitch of the first portions of the plurality of blades can be lower than a pitch of the second portions of the plurality of blades.

In step 635, cooling airflow is directed through the opening in the second spinner into the duct for cooling the engine. In step 640, the cooling airflow is decelerated from a flight airflow speed to an engine cooling airflow speed for cooling the engine. In step 645, the pressure of the cooling airflow exiting through the duct is increased to be substantially equivalent to an air pressure of airflow exiting the ducted fan. According to an alternative exemplary embodiment, a plurality of cooling airfoils can be interspersed among the first portions of the plurality of blades coupled to the first spinner to provide additional cooling airflow to the engine.

Exemplary embodiments of the present invention can be used in any suitable type of ducted fan, such as those used on aircraft, such as, for example, a ducted fan aircraft, a ducted fan vertical takeoff and landing (VTOL) aircraft, or the like. For example, the engine cooling system according to exemplary embodiments can be used in ducted fan aircraft to provide suitable engine cooling, while improving thrust and minimizing airflow separation and drag losses.

It will be appreciated by those of ordinary skill in the art that the present invention can be embodied in various specific forms without departing from the spirit or essential characteristics thereof. The presently disclosed embodiments are considered in all respects to be illustrative and not restrictive.

The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A system for cooling an engine of an aircraft, wherein the engine drives a ducted fan, comprising:
   a first nacelle surrounding the engine;
   a second nacelle substantially concentrically surrounding the first nacelle;
   a first spinner coupled around a base of a rotor of the ducted fan;
   a second spinner substantially concentrically surrounding the first spinner and configured to form a duct between the first and second spinners,
      wherein the second spinner comprises an opening configured to allow air to flow into the duct for cooling the engine, and
      wherein the rotor comprises:
         a plurality of airfoils penetrating through the first and second spinners,
            wherein each of the plurality of airfoils comprises a first portion located in the duct, and a second portion located between the second spinner and a fuselage of the ducted fan,
            wherein the first portions of the plurality of airfoils are configured to provide cooling airflow over the engine and structural support for the second portions, and
            wherein the second portions of the plurality of airfoils are configured to provide thrust for the aircraft.

2. The system of claim 1, wherein a diameter of the first spinner is substantially equivalent to a diameter of the first nacelle.

3. The system of claim 1, wherein a diameter of the second spinner is larger than a diameter of the second nacelle.

4. The system of claim 1, wherein the first nacelle extends substantially aft of the engine.

5. The system of claim 1, wherein the opening in the second spinner comprises an edge radius configured to allow substantially smooth airflow into the duct.

6. The system of claim 1, wherein an aft flange of the second spinner is configured to overlap a fore end of the second nacelle to form a gap, and
   wherein a width of the gap is configured to restrict an amount of cooling airflow through the gap.

7. The system of claim 1, wherein a cross-sectional area of the first spinner is configured to vary along an axial length of the first spinner.

8. The system of claim 7, wherein the varying cross-sectional area of the first spinner is configured to decelerate the cooling airflow from a flight airflow speed to an engine cooling airflow speed for cooling the engine.

9. The system of claim 1, wherein a shape of an aft of the second nacelle is configured to increase pressure of the cooling airflow exiting through the duct to be substantially equivalent to an air pressure of airflow exiting the ducted fan.

10. The system of claim 1, wherein a pitch of the first portion of the plurality of airfoils is lower than a pitch of the second portion of the plurality of airfoils.

11. The system of claim 1, wherein a cross-sectional area of the first portions of the plurality of airfoils is larger than a cross-sectional area of the second portions of the plurality of airfoils to provide the structural support for the second portions.

12. The system of claim 1, comprising:
a plurality of cooling airfoils coupled to the first spinner and interspersed among the first portions of the plurality of airfoils.

13. The system of claim 1, wherein shapes of the first and second spinners are configured to provide an increase in an area of the duct as the cooling airflow passes through the duct.

14. The system of claim 1, wherein the cooling airflow through the duct exits through a gap between the first and second nacelles aft of the engine, and
wherein an area of the gap is configured to provide a speed of the cooling airflow exiting the gap that is substantially equivalent to a speed of an airflow exiting the ducted fan.

15. The system of claim 1, wherein a shape of an aft of the first nacelle is configured to contract aft of the engine to provide a speed of the cooling airflow exiting the duct that is higher than a speed of an airflow exiting the ducted fan.

16. The system of claim 1, wherein the engine is located in substantially close proximity to the rotor.

17. An air-cooling system for an engine of an aircraft, comprising:
a ducted fan comprising a ducted fan rotor,
wherein the engine drives the ducted fan rotor, and
wherein the ducted fan comprises:
a first enclosure surrounding the engine;
a second enclosure substantially concentrically surrounding the first enclosure;
a first spinner coupled around a base of the ducted fan rotor;
a second spinner substantially concentrically surrounding the first spinner and configured to form a channel between the first and second spinners,
wherein the second spinner comprises an opening configured to allow air to flow into the channel for cooling the engine, and
wherein the ducted fan rotor comprises:
a plurality of blades passing through the first and second spinners,
wherein each of the plurality of blades comprises a first portion located in the channel, and a second portion located between the second spinner and an interior wall of the ducted fan,
wherein the first portions of the plurality of blades are configured to provide cooling airflow over the engine and structural support for the second portions, and
wherein the second portions of the plurality of blades are configured to propel the aircraft.

18. A method of cooling an engine of an aircraft, wherein the engine drives a ducted fan, comprising the steps of:
surrounding the engine with a first nacelle;
substantially concentrically surrounding the first nacelle with a second nacelle;
coupling a first spinner around a base of a rotor of the ducted fan;
substantially concentrically surrounding the first spinner with a second spinner to form a duct between the first and second spinners,
wherein the second spinner includes an opening;
arranging a plurality of blades of the rotor to penetrate through the first and second spinners,
wherein each of the plurality of blades includes a first portion located in the duct, and a second portion located between the second spinner and an interior wall of the ducted fan, and
wherein the second portions of the plurality of blades provide thrust for the aircraft; and
directing cooling airflow through the opening in the second spinner into the duct for cooling the engine,
wherein the first portions of the plurality of blades provide cooling airflow over the engine and structural support for the second portions.

19. The method of claim 18, wherein a diameter of the first spinner is substantially equivalent to a diameter of the first nacelle.

20. The method of claim 18, wherein a diameter of the second spinner is larger than a diameter of the second nacelle.

21. The method of claim 18, wherein the first nacelle extends substantially aft of the engine.

22. The method of claim 18, wherein the opening in the second spinner includes an edge radius for allowing substantially smooth airflow into the duct.

23. The method of claim 18, wherein an aft flange of the second spinner overlaps a fore end of the second nacelle to form a gap, and
wherein the method comprises the step of:
restricting an amount of cooling airflow through the gap.

24. The method of claim 18, comprising the step of:
varying a cross-sectional area of the first spinner along an axial length of the first spinner.

25. The method of claim 24, comprising the step of:
decelerating the cooling airflow from a flight airflow speed to an engine cooling airflow speed for cooling the engine.

26. The method of claim 18, comprising the step of:
increasing pressure of the cooling airflow exiting through the duct to be substantially equivalent to an air pressure of airflow exiting the ducted fan.

27. The method of claim 18, comprising the step of:
decreasing an area of the duct aft of the engine to an outlet of the engine as the cooling airflow passes through the duct.

28. The method of claim 18, comprising the step of:
forming a gap between the first and second nacelle aft of the engine through which cooling airflow exits from the duct,
wherein an area of the gap provides a speed of the cooling airflow exiting the gap that is substantially equivalent to a speed of an airflow exiting the ducted fan.

* * * * *